Feb. 6, 1945.                R. B. MENTZER                2,369,068
                              BAND LAP
                          Filed Feb. 25, 1943
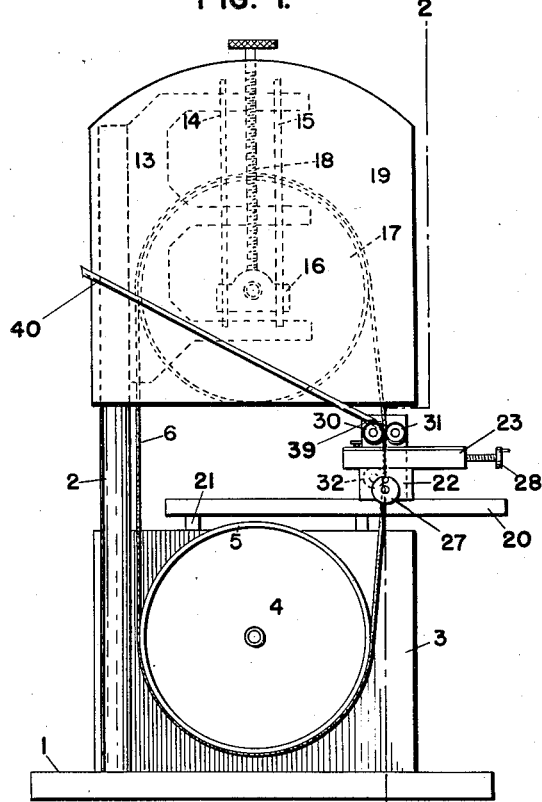
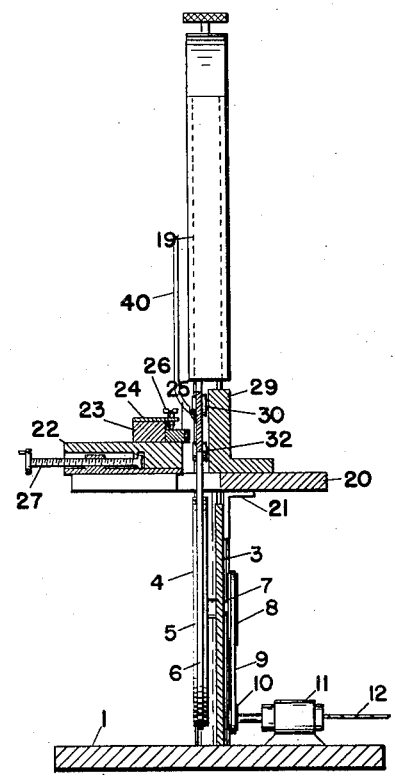
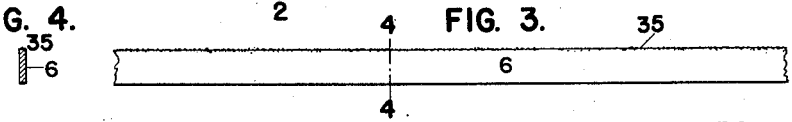
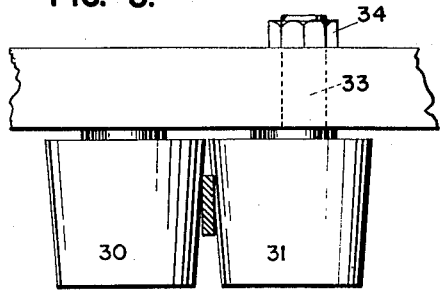
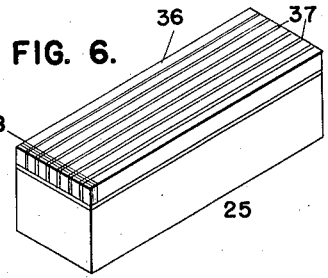
INVENTOR.
RALPH B. MENTZER
BY James R. Heilman Patented Feb. 6, 1945

2,369,068

UNITED STATES PATENT OFFICE 2,369,068

BAND LAP

Ralph Bender Mentzer, New Holland, Pa., assignor to Hamilton Watch Company, Lancaster, Pa.

Application February 25, 1943, Serial No. 477,094

3 Claims. (Cl. 125—21)

This invention is directed to an apparatus for sawing hard material such as used to make watch jewels.

The procedure employed in the cutting of jewels or jewel material is tedious and wasteful. The material, which is usually synthetic sapphire is extremely hard; in fact it can only be efficiently cut with diamonds, and takes considerable time to make the lightest cut. The material generally used to saw these jewels is diamond dust embedded in soft copper. The problem is to avoid waste by reason of wide cuts and to make the saw sufficiently strong to stand continual use.

The present invention is directed to a saw which will accomplish these ends and will be economical and practical to use.

It is the object of the present invention to provide a cutting means for hard material that will make repeated accurate narrow cuts.

It is a further object to provide a saw for jewel material that will not waste the material by wide cuts.

It is a further object to provide a saw of the band saw type that will exert even pressure against the material to be cut.

It is a still further object to provide a fine soft copper blade so held in the apparatus that it will make repeated accurate narrow cuts.

It is a still further object to provide an apparatus that is semi-automatic in operation, requiring only periodic control by the operator.

It is a further object to provide an apparatus of the band saw type, using a narrow diamond dust charged copper blade in which the blade is urged continuously into the material to be cut.

It is a still further object of the invention to provide means for adjusting the blade urging means to provide for different thicknesses of saw blades and different depths of cut.

It is a further object to provide a combination of means for guiding the saw blade with means for urging it into the work.

It is a still further object to provide a pair of cones serving both as a guide and as a means for urging the blade into the work.

It is a still further object to provide a pair of cones to both guide and urge the blade into the work where said cones are adjustable toward each other to accommodate different thicknesses of saw blade and different depths of cut.

The invention is illustrated in the accompanying drawing, in which:

Fig. 1 is a side elevation of the apparatus.

Fig. 2 is a section on line 2—2 of Fig. 1.

Fig. 3 is a broken plan of the copper strip used as a saw and showing the diamond dust exaggerated.

Fig. 4 is a section on line 4—4 of Fig. 3.

Fig. 5 is a detail view of the apparatus showing the blade guiding and urging means.

Fig. 6 is a perspective of the strips of jewel material mounted on a block and showing three cuts made by this apparatus.

The apparatus is of the customary band saw construction generally with a base 1 supporting a standard 2. A supporting plate 3 secured both to the base 1 and standard 2 carries a lower wheel 4 having a flange on whose outer surface a copper strip 6, in the form of a band saw blade travels. The wheel 4 is journaled at 7 and is driven through drive wheel 8, belt 9, motor pulley 10 and motor 11 which is connected to a source of current at 12.

Carried on the standard 2 is a frame work 13 which supports parallel rods 14 and 15. Slidably mounted on these rods is a bearing 16 which carries a top wheel 17 adjustable in a vertical direction through the screw 18. A casing 19 encloses this part of the apparatus all of which is conventional band saw construction.

A work table 20 is supported on brackets 21 attached to the supporting plate 3. Securely fastened to said work table is a gibbed slide 22 for moving the workpiece into engagement with the lap. A second gibbed slide 23 mounted on the slide 22 gives movement at right angles and is used to index the workpiece for each successive cut. A top strip 24 carried on the slide 23 extends over the workblock 25 and holds it in position by screws 26. The slides 22 and 23 are provided with screw adjustments 27 and 28 respectively.

Attached firmly to the work bench by welding, bolts or the like is an L-shaped support 29 which is positioned on the side of the lap blade away from the workpiece. Carried on this L-shaped support are two frusto-conical guiding rollers 30 and 31 and a cylindrical roller 32. It is necessary to hold the copper cutting strip which will hereafter be referred to as the lap in a perfectly straight line at least for the length of the cut. These cuts are only .010 thick and are spaced generally .030.

To maintain a perfectly straight line two frusto-conical guide rollers are used above the workpiece with a single cylindrical roller below said workpiece. The line of travel of the saw is moved beyond a common tangent to the two wheels, mainly to cause the lower cylindrical wheel to revolve, as should it remain stationary, the diamond edged lap would tear it to pieces.

The upper frusto-conical roller 30 is mounted on a spindle secured in the support 29 in any suitable fashion and has an outer covering of corprene or resilient rubber as have frusto-conical roller 31 and cylindrical roller 32. The frusto-conical roller 31 is carried on an eccentric spindle 33 passing through support 29 and secured by nut 34. This allows the frusto-conical rollers to be adjusted with relation to each other and with regard to the lap.

The saw blade 6 is formed of thin strip soft copper, phosphor bronze or the like and has diamond dust 35 rolled into its cutting edge. One application is generally enough to make approximately 60 cuts. The method of affixing this dust is to apply a paste of diamond dust and oil to the edge of the strip and rolling it into the soft copper with a hard roller.

The material which the lap is used upon is the long sticks 36 which have been cut from the boule and which are mounted in parallel relation on a block of transite or similar material. These sticks are held to the block and to each other by sealing wax 37 or some other substance such as stick shellac or the like. The apparatus cuts across the face of the parallel sticks along line 38 as shown in Fig. 6.

The operation is as follows:

The workpiece 25 is secured on slide 23 and by manipulation of slides 22 and 23 is brought into position for the first cut.

A stream of water 39 from pipe 40 is directed against the band lap adjacent the workpiece.

Both of the threaded adjustments 27 and 28 are so calibrated that exactly one turn will produce the desired cut. The lapping band is, of course, turning and the block is brought just into engagement with the cutting edge, the block being positioned for the first cut. Now a full turn of the screw 27 forces the sticks against the band and forces the band back between the frusto-conical rollers whose tendency is to urge said band outward. This tendency causes the band to bear against the sticks with an even balanced pressure tending to cut in an exact straight line until the cut is finished. Further movement of the slides places the workpiece in position to repeat the operation.

The precise nature of the work can only be realized by comparing figures. Formerly with a wide saw cut, that is using the thinnest saw which would give parallel cuts, the cuts were .015 of an inch thick. Using the present saw, cuts running about .005 of an inch are made, thus creating a saving of vital material as well as the increase in time necessary to make changes in machine. This is accomplished by the guiding means that forces the saw into the jewel material at an even rate and without tendency to waver or deviate from a straight line.

What is claimed is:

1. An apparatus for cutting jewel material comprising a moving band lap element, a pair of frusto-conical shaped resilient rollers embracing said band elements on opposite sides, a workholder supporting a workpiece, means for moving said workpiece against band lap element to force said band lap toward the base end of said frusto-conical rollers, the inherent action of said rollers serving to force the band lap against the workpiece sufficiently to complete the cut.

2. An apparatus for cutting jewel material comprising a vertically movable band lap element, a pair of resilient frusto-conical shaped rollers embracing said element on opposite sides and in the same plane, a workholder supporting a workpiece, means for forcing said workpiece against said band lap element to move said band lap element toward the base ends of said frusto-conical rollers, the resilient and inherent action of said frusto-conical rollers serving to force said band lap against said workpiece sufficiently to complete the cut.

3. An apparatus for cutting jewel material comprising a moving band element, a pair of resilient frusto-conical rollers mounted on parallel axes embracing said band lap element on opposite sides and in the same plane, a workholder supporting a workpiece, means for forcing said workpiece against band band lap to move said band lap toward the frusto-conical rollers and toward their bases, the inherent resilient action of said rollers serving to force the band lap element against said workpiece sufficiently to complete the cut.

RALPH B. MENTZER.